United States Patent [19]

Esposito et al.

[11] 4,270,949
[45] Jun. 2, 1981

[54] MAKING OF STEEL BY THE BOF PROCESS

[75] Inventors: Edward J. Esposito, Cortland; Matthew J. Blair, Niles, both of Ohio

[73] Assignees: United Refractories, Inc., Warren, Ohio ; by said Edward J. Esposito; Republic Steel Corporation, Cleveland, Ohio ; by said Matthew J. Blair

[21] Appl. No.: 6,284

[22] Filed: Jan. 24, 1979

[51] Int. Cl.² ............... C21C 5/44; F27D 1/16; C21C 7/00
[52] U.S. Cl. ............................. 75/60; 75/52; 75/95; 264/30
[58] Field of Search ............... 75/60, 95, 52; 264/30

[56] References Cited

U.S. PATENT DOCUMENTS

| | | | |
|---|---|---|---|
| 2,886,308 | 5/1959 | Boynton | 75/60 |
| 2,991,173 | 7/1971 | Trentini | 75/52 |
| 3,030,203 | 4/1962 | Hilliard | 75/60 |
| 3,212,882 | 10/1965 | Garfinkle | 75/60 |
| 3,505,062 | 4/1970 | Woodcock | 75/60 |
| 4,107,244 | 8/1978 | Ochiai | 264/30 |

Primary Examiner—P. D. Rosenberg
Attorney, Agent, or Firm—Michael Williams

[57] ABSTRACT

The usual oxygen lance, and a coating lance, are disposed in upright and spaced-side-by-side relation for selective lowering into the BOF vessel when the latter is in the normal upright position it occupies for refinement of its metallic charge. Preferably, the coating lance is lowered into the vessel immediately after the latter has been charged with scrap and molten iron and moved to its upright position. At this time the oxygen lance is in standby position while refractory coating material is forced through the coating lance and outwardly of its nozzle to coat various areas of the vessel lining. Thereafter, the coating lance is withdrawn from the vessel and the oxygen lance is inserted and the refining process is begun. At this time, the coating lance is held in standby position.

8 Claims, 4 Drawing Figures

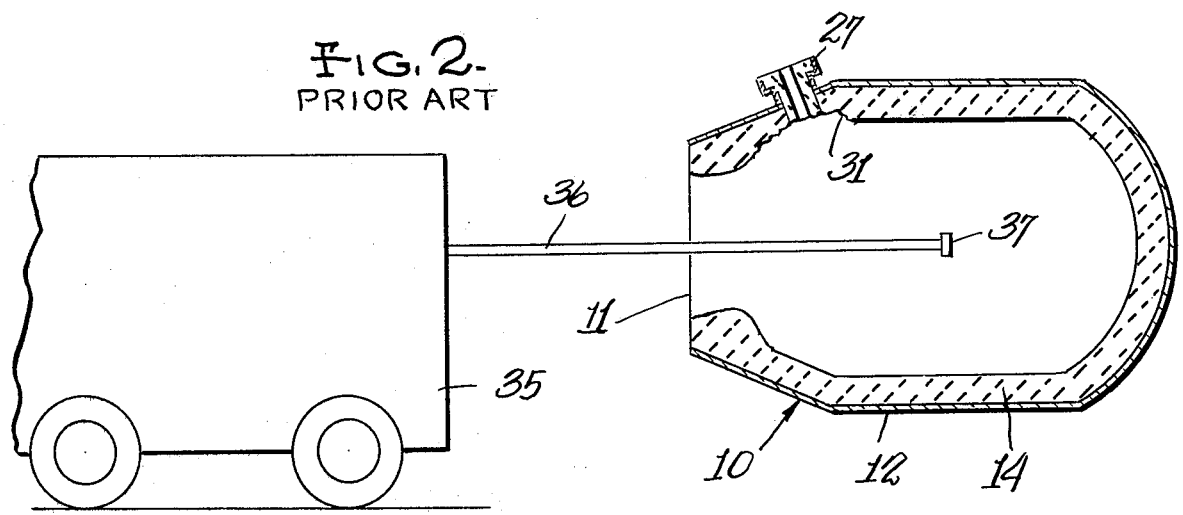
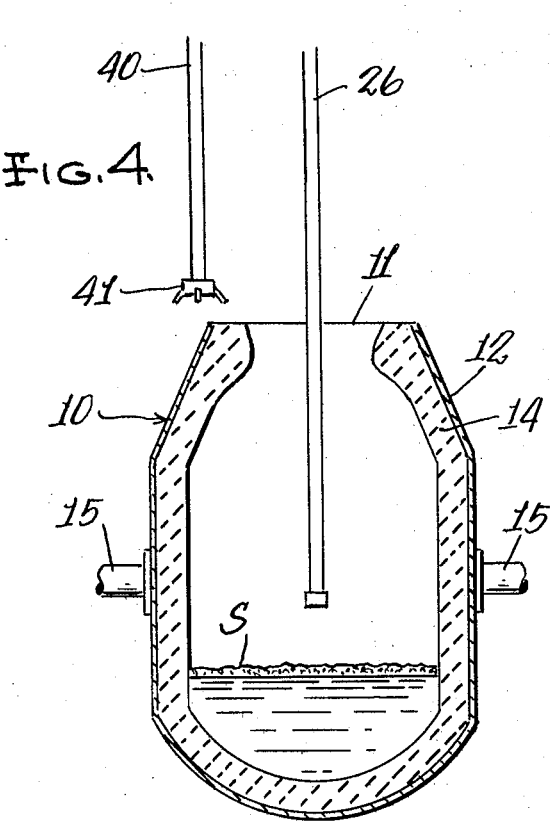
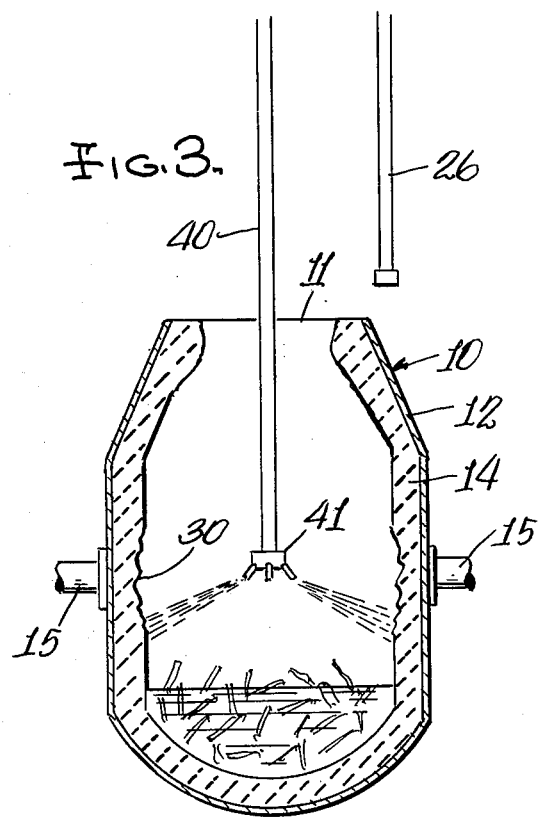

MAKING OF STEEL BY THE BOF PROCESS

BACKGROUND

Manufacture of steel in the modern BOF furnace is a highly automated and efficient method and has largely replaced manufacture of steel in the open hearth furnace.

As background material and description of a presently-used method of BOF operation, the furnace comprises a huge upright vessel 10 which is open at the top 11. The vessel has a steel shell 12 which is interiorly lined with fire brick 14. Trunnions 15 extend outwardly from opposite sides of the steel shell and are contained in bearings (not shown) which are mounted on a stationary part of the superstructure. The trunnions and bearings provide for tilting of the vessel about a horizontal axis. Most vessels are more than 32 feet in height and therefore represent a considerable mass to tilt. The vessels are moved about the trunnion pivots by motors controlled from the pulpit adjacent to the furnace.

As seen in FIG. 1, in order to charge the vessel 10, the same is tilted to the dotted line position A and steel scrap is dumped from a scrap car 16 into the vessel through its open end 11. The car 16 has wheels 17 which roll along rails to and away from position adjacent to the vessel. The car has a pivot support 18 so that it may be tilted to the dotted line position so as to dump its load into the vessel. In some cases instead of a wheeled car, a crane-supported scrap vessel is used.

After dumping its load, the car 16 is moved along the rails to a position removed from the vessel and wherein it may receive another load of scrap. A metal ladle 20 has trunnions 21 supported within crane hooks 22. The ladle is of substantial capacity and may contain about 150 tons of molton pig iron. After the scrap car has been removed, the ladle 20 is moved to the vessel 10 and tilted to pour its contents into the latter. Thereafter the ladle 20 is moved away from the vessel to a position wherein it may receive another charge of molten metal. Normally the charge into the vessel 10 consists of about 30% steel scrap and 70% molten pig iron, so that the metal charge into the vessel 10 is in the neighborhood of about 200 tons.

After the vessel 10 has received its charge, it is returned to upright position and the lance 26 is lowered into the vessel; a flow of oxygen is started and the steelmaking process is under way. Within seconds after the oxygen is turned on, it is ignited by the hot metal and reaction with the impurities of the charge commences. At this point in the process, the prescribed weight of fluxes are added to the vessel. Under normal operating conditions, the time elapsed from the charging of scrap to the start of the oxygen blow averages less than three minutes.

When the blow is completed, as determined by the furnace operator utilizing the results of calculations by a computer, the lance 26 is withdrawn and the vessel is tilted to a horizontal position toward the charging aisle, as shown by the dot-dash lines B. A temperature reading is secured with an immersion-type thermocouple, and a sample of the steel is obtained and sent to a nearby chemical laboratory where a vacuum spectrometer, within a few minutes, determines the individual content of chemical elements in the steel, including carbon, phosphorus and sulphur.

If the temperature and chemical content of the steel are correct, the vessel 10 is then tilted in the opposite direction shown by dot-dash lines C in FIG. 1 and the molten steel will drain through the tap hole 27 and into the teeming ladle 28. The slag floats on top of the molten steel, as shown at S in FIG. 4, and will not flow through the tap hole until substantially all the steel has been removed from the vessel, and when slag does appear at the tap hole the vessel 10 is immediately moved toward upright position.

After conclusion of tapping, the vessel 10 is tilted in a direction toward the charging aisle and beyond the position B to invert it and dump the slag remaining in the vessel into slag ports 29. From this inverted position, the empty vessel is returned to its charging position A to receive a charge for the next heat. All of the foregoing, from charge to subsequent charge, is accomplished in a matter of about 25 to 28 minutes and it will therefore be appreciated that the BOF process is highly efficient and economical, especially when compared with the open hearth process.

In actual practice, it has been noted that the vessel lining has a tendency to deteriorate in various areas thereof, and this may be due to various factors. For example, pure oxygen issues from the lance nozzle at a pressure that is normally held between 140 and 180 pounds per square inch. The action of the oxygen jet is partly chemical and partly physical. Striking the liquid bath, the oxygen immediately starts reactions leading to the formation of iron oxide, part of which disperses rapidly throughout the bath. Carbon monoxide is evolved, which gives rise to a vigorous boiling action and accelerates the refining metalergical reactions. Other factors also contribute to deterioration of the vessel lining, and such deterioration is particularly prevalent in the trunnion area, as indicated at 30 in FIG. 3 and the tap hole area, as indicated at 31 in FIG. 2.

If the lining deterioration is not corrected, the furnace will soon reach a point where it must be taken out of service for relining, and downtime for this is usually on the order of three to five days, assuming the lining material is immediately available.

A prior art process for correcting lining deterioration is shown in FIG. 2. This process is used after the slag has been dumped from the vessel. In such use, the vessel is moved from its inverted position to the horizontal position shown in FIG. 2. A tractor 35 carrying a horizontally disposed coating lance 36 is moved so that the latter enters the vessel 10 through its mouth. A refractory coating, in fluid form, is forced through the lance 36 and issues from the lance nozzle 37 and is deposited on the deteriorated areas of the lining, the lance being rotatable about its longitudinal axis to deposit the coating at any portion of the interior of the vessel.

Although this prior art process has produced acceptable results, it has added considerable time to the steelmaking cycle each time it is used. For example, the vessel 10 must be held at the horizontal position shown in FIG. 2, instead of moving uninterrupted from its inverted position to its charging position A. The tractor 35 must be driven to position adjacent to the mouth of the vessel and this is sometimes done with difficulty, considering the cluttered area adjacent to the furnace. It has been observed that use of the prior art process for lining repair has added about 15 to 40 minutes to a steelmaking cycle and this seriously affected the economical advantages of the BOF system. However, considering the alternative of a three- to five-day downtime for relining, the industry had no choice.

SUMMARY

In use of our invention, a coating lance is disposed in position substantially parallel to, but spaced from, the usual oxygen lance, and the two lances are constructed and arranged for selective disposition within the BOF vessel. In the preferred practice, the coating lance is lowered into the vessel immediately after the latter has received its metallic charge and has been moved to its upright position. After the affected parts of the vessel lining have been coated, the coating lance is withdrawn and the oxygen lance is inserted, and the refining process is begun.

DESCRIPTION OF THE DRAWINGS

In the drawings accompanying this specification, and forming part of this application, there is shown, for purpose of illustration, an embodiment which our invention may assume, and in these drawings:

FIG. 2 is a generally-schematic representation of a presently-used method for coating deteriorated areas of a BOF vessel lining, FIG. 3 is a generally-schematic representation of our improved method of coating deteriorated areas of a BOF vessel lining, and FIG. 4 is a view similar to FIG. 3 with the oxygen lance in position for refining of metal in the BOF vessel.

DESCRIPTION OF THE PREFERRED EMBODIMENT

Figure 1:
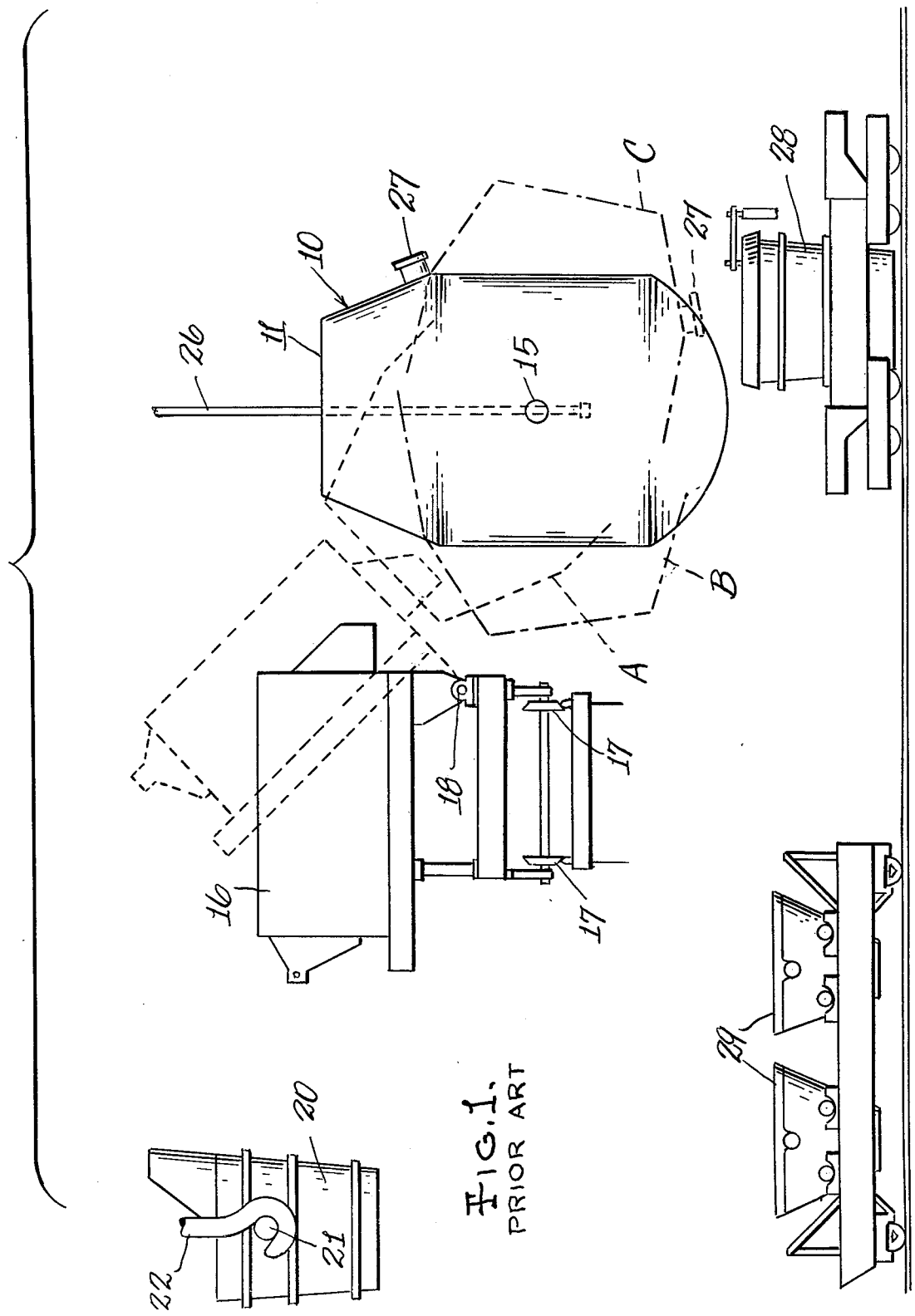
FIG. 1 is a generally-schematic representation of various items of a presently-used BOF system.

In use of our improved process, very little time is added to the BOF cycle since it is not required to move a truck to and from position as in the prior art. As seen in FIG. 3, the vessel has been charged with scrap and molten iron. The oxygen lance 26 is shown in a stand-by position and a coating lance 40 is lowered into the vertically-arranged vessel 10 through the mouth thereof.

The coating lance 40 is connected to a source (not shown) of refractory coating material under pressure. When the control valve (not shown) is opened, refractory coating material is sprayed through a head 41 and onto the affected areas of the lining. The head is rotatable about a vertical axis so that it will spray coating material along the periphery of the lining, and the lance may be raised and lowered to coat the desired areas. It will be noted that the head 41 has downwardly-inclined nozzles 42 so that coating material may be applied with the head sufficiently above the charged material as not to be affected thereby.

After the coating has been applied, the coating lance 40 is removed from the vessel to a stand-by position, and the oxygen lance is inserted into the vessel and the usual refining process is carried out. It will therefore be appreciated that very little time is added to the normal BOF cycle and this is an important factor, especially when it is considered that coating is sometimes required for each charge. As a matter of fact, it is preferred to coat on each cycle as a preventative maintenance measure to coat areas that are subject to the greatest deterioration. In normal operation, our improved process has added only about 2 to 3 minutes to the steelmaking cycle which is well within economies that may be tolerated by the steelmaking industry.

We claim:

1. The combination of a BOF vessel used in the making of steel, said vessel being refractory lined and movable about a substantially horizontal axis to and from an upright position, and adapted to receive a charge of iron scrap and molten iron, and an oxygen lance and means for moving said lance into said vessel at predetermined times when said vessel is in upright position, said lance performing its normal function of delivering oxygen under pressure from the nozzle of the lance and onto the metallic charge within said vessel to refine the metal, the improvement for coating areas of said vessel lining with refractory material, comprising:

a coating lance separate from said oxgyen lance and having an outlet nozzle and an inlet connected to a source of flowable refractory material, means for moving said coating lance into said vessel while the latter is in an upright position to dispose its nozzle in cooperative relation with any lining area in need of repair, and means for holding said oxygen lance in standby, inoperative position when said coating lance is within said vessel.

2. The improvement according to claim 1 wherein said coating lance nozzle is rotatable.

3. The improvement according to claim 1 wherein said oxygen lance and said coating lance are correlated so that when said oxygen lance is within said vessel, said coating lance is outside of said vessel in standby relation.

4. The improvement according to claim 3 wherein the correlation of said oxygen lance and said coating lance is such that said coating lance is moved into said vessel after said charge has been deposited therein, means withdrawing said coating lance from said vessel after the coating operation is completed and shifting said coating lance to standby position to provide for movement of said oxygen lance into said vessel for a normal part of the steelmaking sequence of operations.

5. An improved and efficient method of coating areas of the lining of a normal BOF vessel which are subject to deterioration, said vessel being movable about a horizontal axis and normally held in upright position after it has received its metallic charge and is ready for the lowering of the usual oxygen lance for the refining of the said metallic charge, said method comprising:

holding said oxygen lance outside of said furnace in standby position while lowering a coating lance into said vessel in amount wherein its nozzle is in operative relation with a selected area of said vessel lining, moving a flowable refractory coating material from a source through said coating lance and outwardly of said coating lance nozzle for deposition on said selected area, removing said coating lance from said vessel and holding it in standby position, and lowering said oxygen lance from its standby position into said furnace and thereafter following the normal sequence of steelmaking operations.

6. The method according to claim 5 and including the step of rotating said coating lance nozzle while said refractory coating material issues therefrom.

7. An improved and efficient method of coating areas of the lining of a normal BOF vessel which are subject to deterioration, said vessel being movable about a horizontal axis to either side of an upright position wherein its axis is substantially vertical, said improved method being used in conjunction with the following normal sequence of steelmaking operations:

a. moving said vessel in one direction from a tilted charging position to said upright position, the vessel in charging position being adapted to receive a charge of iron scrap and molten iron through its mouth, b. holding the vessel in upright position and lowering an oxygen lance into said vessel and issuing oxygen from said lance onto said charge to refine the metal, c. withdrawing said lance from said vessel after said metal has been refined.

d. moving said vessel in an opposite direction to a position wherein its longitudinal axis is substantially horizontal and testing to determine temperature and chemical content, e. when testing indicates proper temperature and chemical content, moving said vessel in said one direction through said upright position and to a position wherein its longitudinal axis is substantially horizontal to permit the refined metal in molten condition to drain through the vessel tap hole, f. moving said vessel in an opposite direction past said upright position and to an inverted position to dump slag from said vessel, and returning said vessel to said tilted position to receive a subsequent charge, the improved method comprising:

lowering a coating lance into said vessel when it has been swung to said upright position and before said oxygen lance has been lowered into said vessel, to position an outlet nozzle of said coating lance in operative relation with an area of said vessel lining that is subject to deterioration, moving a flowable refractory coating material from a source through said coating lance and outwardly of said coating lance nozzle to deposit the same on the selected area of said vessel lining, and removing said coating lance from said vessel and following the normal sequence of steelmaking operations.

8. The method according to claim 7 and including the step of rotating said coating lance nozzle while said refractory coating material issues therefrom.

* * * * *